United States Patent
Konuma et al.

[11] Patent Number: 5,856,853
[45] Date of Patent: Jan. 5, 1999

[54] SHORT CIRCUIT PREVENTING FILM OF LIQUID CRYSTAL ELECTRO-OPTICAL DEVICE AND MANUFACTURING METHOD THEREOF

[75] Inventors: Toshimitsu Konuma; Akira Sugawara; Yukiko Uehara, all of Kanagawa, Japan

[73] Assignee: Semiconductor Energy Laboratory Co., Ltd., Kanagawa, Japan

[21] Appl. No.: 839,936

[22] Filed: Apr. 18, 1997

Related U.S. Application Data

[63] Continuation of Ser. No. 258,971, Jun. 13, 1994, abandoned.

[30] Foreign Application Priority Data

Jun. 16, 1993 [JP] Japan .................................. 5-169548

[51] Int. Cl.[6] .......................... G02F 1/136; G02F 1/1333
[52] U.S. Cl. ................................ 349/42; 349/43; 349/110; 349/111; 349/138
[58] Field of Search ................................ 359/74, 79, 87, 359/66, 67, 58, 59, 60; 205/322, 324, 332, 333, 122; 349/42, 110, 111, 138, 139, 43

[56] References Cited

U.S. PATENT DOCUMENTS

| | | | |
|---|---|---|---|
| 4,528,073 | 7/1985 | Sano et al. ........................ | 204/15 |
| 4,581,619 | 4/1986 | Mizutome et al. ................ | 359/36 |
| 5,194,136 | 3/1993 | Jeung et al. ...................... | 205/122 |
| 5,200,668 | 4/1993 | Ohashi et al. .................... | 313/498 |
| 5,311,338 | 5/1994 | Kim et al. ......................... | 359/70 |
| 5,412,494 | 5/1995 | Ishiwata et al. .................. | 359/67 |
| 5,545,571 | 8/1996 | Yamazaki et al. ................ | 205/324 |

FOREIGN PATENT DOCUMENTS

| | | | |
|---|---|---|---|
| 53-116854 | 10/1978 | Japan .................................. | 359/79 |
| 54-073064 | 6/1979 | Japan .................................. | 359/79 |
| 59-202435 | 11/1984 | Japan .................................. | 359/74 |
| 63-139320 | 6/1988 | Japan .................................. | 359/74 |
| 2-211427 | 8/1990 | Japan .................................. | 359/79 |

*Primary Examiner*—William L. Sikes
*Assistant Examiner*—Julie Ngo
*Attorney, Agent, or Firm*—Sixbey, Friedman, Leedom & Ferguson, P.C.; Gerald J. Ferguson, Jr.

[57] ABSTRACT

In an active matrix type liquid crystal electro-optical device using thin-film transistors, a metal film is formed on a transparent electrode that is opposed to the thin-film transistors. The metal film is oxidized by anode oxidation method using the electrode as an anode, to form a metal oxide film that serves as a short circuit preventing film. Alternatively, after a grid-shaped mask is formed on the metal film, the metal film is oxidized using the electrode as an anode, the mask is removed, and the metal film is again anode-oxidized, to form a non-oxidized portion. Thus, transparent and opaque regions, i.e., a black matrix is formed.

22 Claims, 2 Drawing Sheets

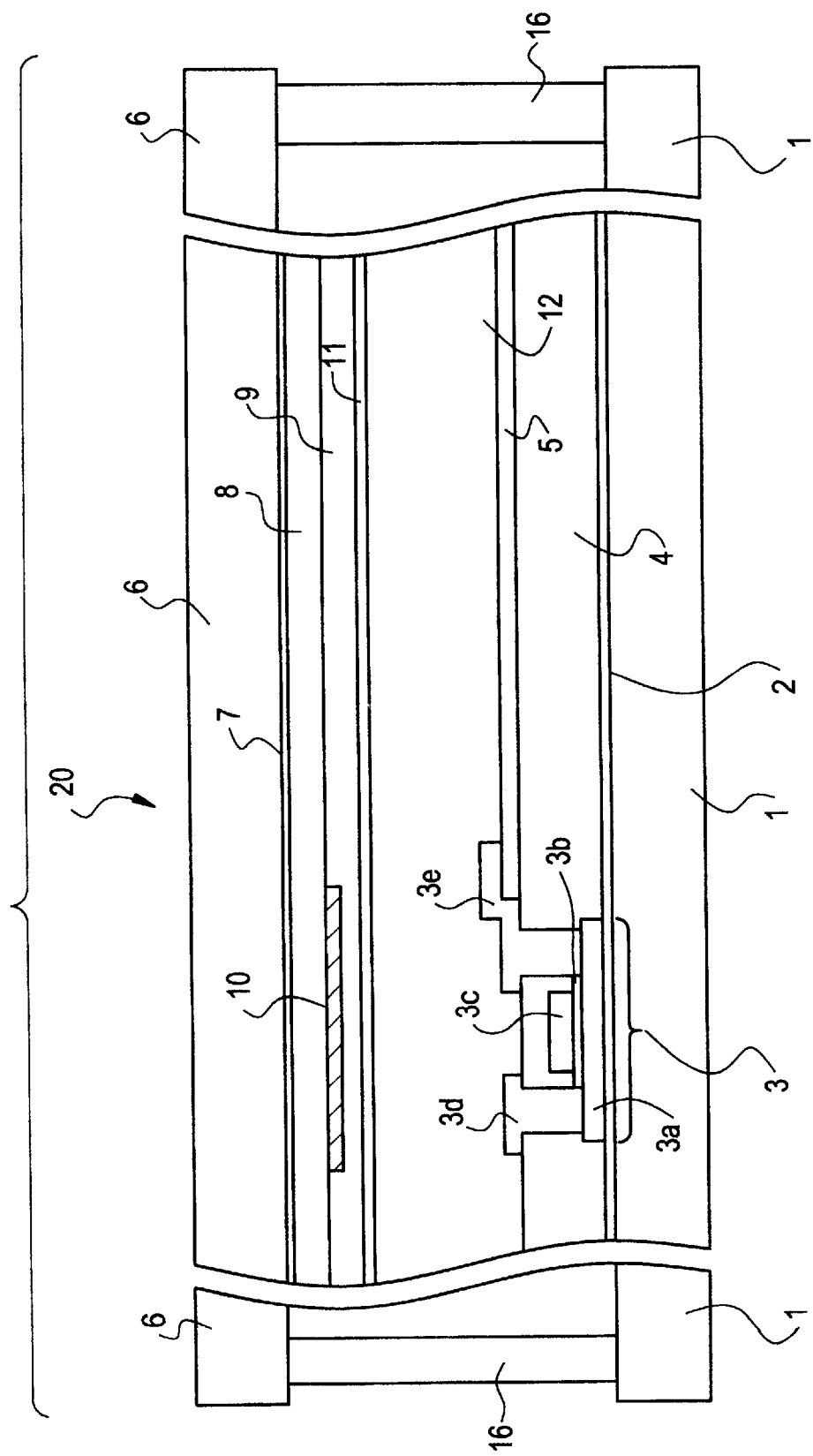

SHORT CIRCUIT PREVENTING FILM OF LIQUID CRYSTAL ELECTRO-OPTICAL DEVICE AND MANUFACTURING METHOD THEREOF

This application is a continuation of Ser. No. 08/258,971, filed Jun. 13, 1994, now abandoned.

BACKGROUND OF THE INVENTION

1. Field of the Invention

The present invention relates to a short circuit preventing film for preventing short-circuiting between electrodes which is suitable for use in a liquid crystal electro-optical device. The invention also relates to a manufacturing method of such a film.

2. Description of the Related Art

In recent years, liquid crystal electro-optical devices have been investigated actively. A liquid crystal electro-optical device is constructed such that a pair of substrates are facing with each other, electrodes or electrodes and switching elements such as thin-film transistors are provided inside the respective substrates, and a space between the substrates are filled with a liquid crystal material. The liquid crystal electro-optical device may be used as display or some other function utilizing an optical response characteristic of the liquid crystal material.

Each of the substrates of the liquid crystal electro-optical device that face each other has an electrode on its surface, and the interval between those electrodes is very small; for instance, 5–8 $\mu$m in TN (twisted nematic) type devices and 1–4 $\mu$m (typically, 1.5 $\mu$m) in devices using a ferroelectric liquid crystal. Therefore, when a very small impurity, dust, etc. exists between the electrodes, very serious problems occur. More specifically, short-circuit between the electrodes produces by existence of the impurity or the like. Therefore, a display failure, a defective point in a display, or other problems occur.

Conventionally, to solve this problem, a silicon oxide ($SiO_2$) film of about 1,000 Å in thickness is formed as a short circuit preventing film. However, pinholes are likely to produced in this film. The breakdown voltage of $SiO_2$ film having 1,000 Å in thickness is low, in a range of 5 to 20 V and changes largely. Therefore, this film does not have sufficient characteristics for short circuit prevention. In addition, since the relative dielectric constant of this film is as low as 2 to 5, a loss of an electric field to be applied to the liquid crystal material produces, deteriorating characteristics of the device, such as the contrast.

SUMMARY OF THE INVENTION

An object of the present invention is to provide a high-performance short circuit preventing film for preventing short-circuiting between electrodes which film is suitable for use in a liquid crystal electro-optical device.

According to the invention, there is provided a short circuit preventing film formed on a transparent electrode and having an anode-oxidized metal film.

According to the invention, there is provided a short circuit preventing film formed on the transparent electrode, and comprising a metal film that includes an oxidized portion produced by anode oxidation and a non-oxidized portion.

According to the invention, there is provided a short circuit preventing film formed on the transparent electrode, and comprising a metal film including an oxidized portion produced by anode oxidation and a non-oxidized portion that is located at least in an area contacting with the transparent electrode.

According to the invention, there is provided a short circuit preventing film formed on the transparent electrode, and comprising an anode-oxidized metal film including a transparent region and an opaque region that are located at least in an area contacting with the transparent electrode. In this constitution, the opaque region is formed in a grid shape.

Further, according to the invention, there is provided a liquid crystal electro-optical device comprising the short circuit preventing film having one of the above constitutions.

According to the invention, there is provided a short circuit preventing film formed on an electrode of a liquid crystal electro-optical device and having an anode-oxidized metal film. The metal film is mainly made of one or a plurality of metals selected from aluminum, titanium, tantalum and tungsten.

Further, according to the invention, there is provided a method for producing a short circuit preventing film, comprising the steps of forming a metal film on a transparent electrode, and anode-oxidizing the metal film using the transparent electrode as an anode.

According to the invention, there is provided a method for producing a short circuit preventing film of an active matrix type liquid crystal electro-optical device using thin-film transistors, comprising the steps of forming a metal film on a transparent electrode that is opposed to the thin-film transistors, and anode-oxidizing the metal film using the transparent electrode as an anode.

According to the invention, a method for producing a short circuit preventing film, comprising the steps of forming a metal film on a transparent electrode, forming a mask on the metal film, anode-oxidizing the metal film using the transparent electrode as an anode, removing the mask, and again anode-oxidizing the metal film. In this method, the mask is formed in a grid shape.

When a metal film made of, for instance, aluminum, titanium, tantalum or tungsten is oxidized by anode oxidation method using a weak acid such as tartaric acid, a transparent oxide film having a very dense surface (a barrier type anode-oxidized film) can be formed. Therefore, almost no pinhole produced. The metal oxide film is 1,000 Å in thickness and has a stable, high breakdown voltage in the range of 60 to 80 V. The surface of the metal oxide film is sufficiently hard. Thus, this metal oxide film has much superior performance that is particularly suitable for preventing short-circuiting in a liquid crystal electro-optical device.

Further, this metal oxide film has a relative dielectric constant of 8 to 9 that is much larger than 2 to 5 of $SiO_2$. Therefore, the existence of the short circuit preventing film can make the loss of an electric field applied to a liquid crystal material very small. This enables the liquid crystal material to be supplied with a stable and sufficiently strong electric field, which enables the provision of a high contrast display device.

The metal oxide film might be formed by anode oxidation such that a current flows through a metal film itself formed on an electrode on a substrate. However, according to this method, the electric resistance of the film itself increases as the oxidation proceeds. Therefore, it takes a long time to produce a metal oxide film and, in some cases, oxidation is not effected sufficiently over the entire film. As a result, it may be the case that a metal oxide film produced is not sufficiently transparent, or that oxidation is not uniform.

In an active matrix type liquid crystal electro-optical device using thin film transistors, an electrode that is opposed to a pixel electrode connected to the thin-film transistors is formed as a single electrode covering the entire substrate. Therefore, very good anode oxidation can be performed in a short time by causing a current to flow through the electrode after a metal film is formed on the electrode.

If a resist film is provided as a mask on the surface of the metal film before the anode oxidation, resist-provided portions are not oxidized. Therefore, by again performing oxidation after first oxidation is performed with the resist film and then the resist film is removed, the surface of the metal film is oxidized to become transparent and insulating. On the other hand, there can be formed inner portions that are in contact with the electrode which portions are not oxidized and, therefore, reflective (opaque). By utilizing this fact, transparent regions and opaque regions can be formed as desired in the area of the metal oxide film contacting with the electrode. For example, in a liquid crystal electro-optical device having thin-film transistors, opaque regions may be formed in a grid shape in desired portions of the opposing electrode that are opposed to the thin-film transistors, signal electrodes and scanning electrodes so as to form transparent regions in pixel regions for light switching. In this manner, what is called a black matrix for avoiding light leakage can be patterned. While conventionally the black matrix is formed by depositing a chromium or carbon film and then patterning it, the invention eliminates those steps.

BRIEF DESCRIPTION OF THE DRAWINGS

FIG. 1 is a sectional view of a liquid crystal electro-optical device according to an embodiment of the present invention.

DETAILED DESCRIPTION OF THE PREFERRED EMBODIMENT

Figure 2A:
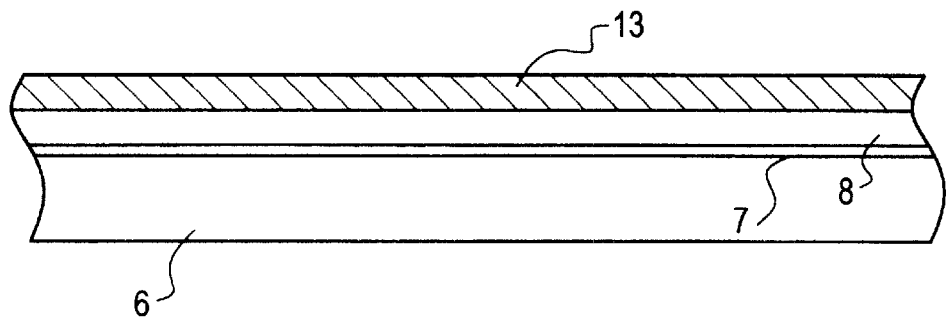
FIGS. 2A–2D show processes of manufacturing a short circuit preventing film of the liquid crystal electro-optical device according to the embodiment of the invention.
Figure 2B:
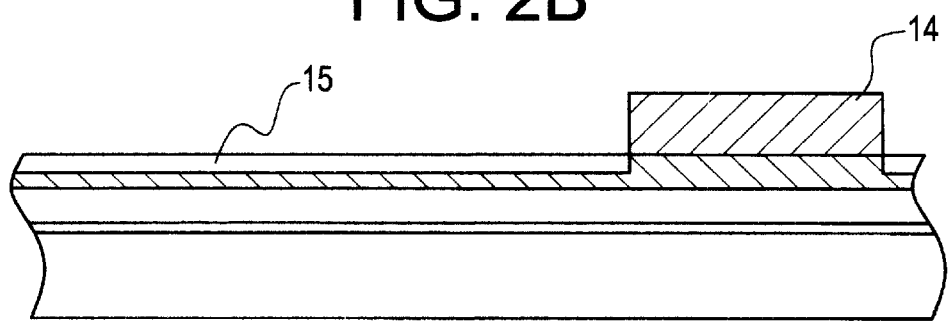

An embodiment of the present invention will be described with reference to the accompanying drawings.

In this embodiment, an active matrix type liquid crystal electro-optical device having a short circuit preventing film, using a ferroelectric liquid crystal, is manufactured. FIG. 1 is a sectional view of a liquid crystal electro-optical device according to the embodiment.

As shown in FIG. 1, in a liquid crystal electro-optical device 20 such as a liquid crystal cell, a base film 2, thin film transistors (TFTs) 3 (a semiconductor layer 3a in which source, drain and channel regions are formed, a gate insulating film 3b, a gate electrode 3c and source/drain electrodes 3d and 3e), an interlayer insulating film 4, a pixel electrode 5, and other electrodes (not shown) are provided on a substrate 1. A base film 7, an opposing electrode 8, a short circuit preventing film 9, a black matrix 10 and an orientation (alignment) film 11 are provided on a substrate 6 that is opposed to the substrate 1. A liquid crystal material 12 is interposed between the substrates 1 and 6, and filled in a space between those substrates. A sealing material 16 of epoxy resin is formed on one of the substrates 1 and 6 by screen printing.

Manufacturing processes of the liquid crystal electro-optical device according to the embodiment will be described below. First, the substrate 1, on which thin film transistors as active elements are to be provided, is formed using a Corning #7059 glass substrate (thickness: 1.1 mm; size: 300 mm×400 mm). A silicon oxide film as the base film 2, a plurality of polysilicon thin film transistors 3, the interlayer insulating film 4 made of a silicon oxide film, an ITO (indium tin oxide) film as the pixel electrode 5, and other electrodes are formed on the substrate 1 by respective known methods.

Subsequently, the opposing electrode 6 is formed. FIGS. 2A–2D show manufacturing processes of the short circuit preventing film according to this embodiment. A Corning #7059 glass substrate is used as the substrate 6. A 200-Å-thick silicon oxide film as the base film 7 is formed on the substrate 6 by sputtering. Then, a 1,000-Å-thick ITO film as the opposing electrode 8 is deposited by sputtering at the room temperature to 150° C. (at the room temperature in this embodiment), and thereafter annealed at 200°–400° C. (at 350° C. in this embodiment) in an oxygen or air atmosphere (in an oxygen atmosphere in this embodiment).

As shown in FIG. 2A, an aluminum film 13 of 500–2,000 Å (1,000 Å in this embodiment) in thickness is formed on the opposing electrode 8 by sputtering or electron beam evaporation (sputtering in this embodiment).

A photoresist film 14 is applied to the aluminum film 13, and patterned into a grid-like shape that is suitable for forming the black matrix 10 with respect to the pixel electrode 5. AZ1350 of Shipley Co., Ltd., Photoneece of TORAY INDUSTRIES, INC., and other materials can be used as the resist material. AZ1350 is employed in this embodiment.

Anode oxidation is performed in an ethylene glycol solution including 1–5% (4% in this embodiment) of tartaric acid with the opposing electrode 8 used as an anode. The oxidation proceeds to form a 400-Å-thick aluminum oxide film 15 having a dense surface (see FIG. 2B).

Figure 2C:
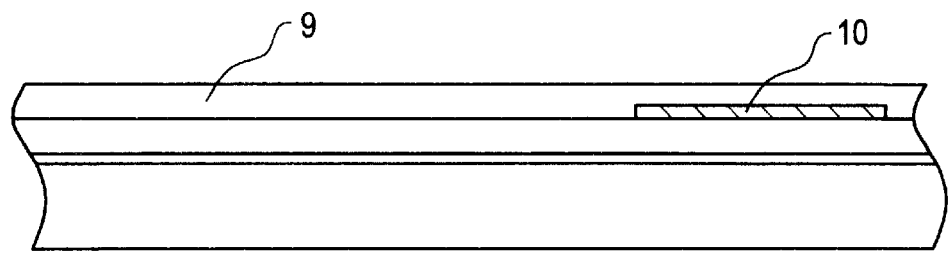
Figure 2D:
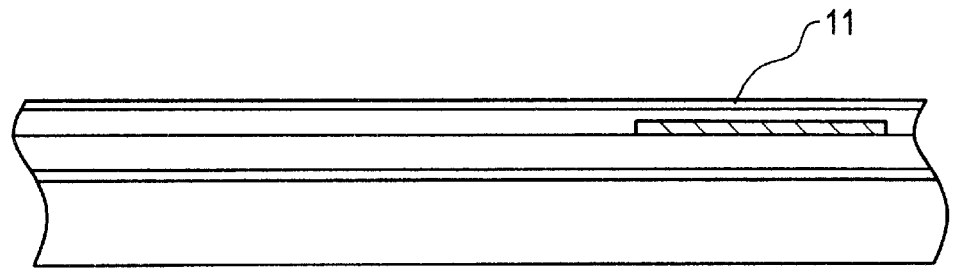

After the photoresist film 14 is removed, anode oxidation is again performed. As a result, the aluminum oxide film in the portion in which the photoresist film 14 is formed becomes thinner than in the remaining portion. Therefore, even where the aluminum film 13 is fully oxidized in the latter portion, the former portion can be so constructed as to have an aluminum oxide film on the surface side and a non-oxidized aluminum film on the side that is in contact with the electrode 8. The non-oxidized aluminum portion can be formed as the opaque black matrix 10 (about 400 Å in thickness). The aluminum oxide film portion is completely made of aluminum oxide and is transparent and insulating. Thus, the short circuit preventing film 9 is formed as shown in FIG. 2C.

It is found that the aluminum oxide portion is about 1.5 times thicker than the original aluminum film before oxidation (not reflected in FIGS. 2A–2D). To provide a sufficiently high breakdown voltage, the aluminum oxide portion should be equal to and thicker than 200 Å, desirably equal to and thicker than 600 Å. Where the black matrix 10 need not be formed, the entire aluminum film 13 is subjected to anode oxidation at one time without using the photoresist film 14, to form a transparent short circuit preventing film over the entire area.

When the surface of the aluminum film formed by the above processes that is not in contact with the opposing electrode 8 is examined with a SEM (scanning electron microscope), a very dense oxide film including the portion in which the photoresist film 14 is formed is observed. No pinhole is found by an observation using a transmission type optical microscope.

In the above manner, the aluminum oxide short circuit preventing film 9 can be formed. It is found that the short circuit preventing film 9 has a breakdown voltage of 60 V (average) and a relative dielectric constant of 8.5. Further, the light transmittance is 74% in the transparent region and 1% in the opaque region, i.e., in the black matrix 10.

Then, to form the orientation film 11 on the short circuit preventing film 9, polyimide is applied by spin coating and fired at 280° C. The thickness of the polyimide film is 100 Å. LP-64 of TORAY INDUSTRIES, INC. is used as polyimide. The substrate 6 having the above multiple layers is subjected to a rubbing treatment that is a uniaxial orientation treatment (see FIG. 2D). No orientation treatment is performed in the substrate 1 on which the thin film transistors 3 and other layers are formed. Thus, a one-sided orientation liquid crystal cell is formed.

Silica particles ("Shinshikyu" of CATALYSTS & CHEMICALS INDUSTRIES CO., LTD.; not shown) are scattered as spacers on the substrate 6 on which the orientation film 11 is formed, and the sealing material 16 of epoxy resin is formed on the other substrate 1 by screen printing. Conductive paste is dropped onto one substrate so that the opposing substrate potential becomes equal to the ground potential of the thin film transistors 3. The two substrates 1 and 6 are bonded to each other while their interval is kept at about 1.5 μm by the spacers. Thus, the liquid crystal cell is completed.

CS1014 of Chisso Corporation, which is a ferroelectric liquid crystal, is used as the liquid crystal material 12. The liquid crystal cell and the liquid crystal material are heated at 100° C. After the liquid crystal is injected into the liquid crystal cell under a vacuum condition, it is gradually cooled to the room temperature at a rate of 5° C./hour. By observing orientation states at the room temperature with a polarizing microscope (after the cooling), a good extinction is obtained, assuring that the liquid crystal material shows uniaxial orientation in the rubbing direction.

To measure optical characteristics of the liquid crystal cell, the intensity of transmission light of the liquid crystal cell is detected by a photomultiplier in a crossed-Nicol arrangement using a polarizing microscope having a halogen lamp as a light source. Measurement results are: a dark state value of 0.2; a light state value of 40; and a contrast ratio of 200. It is confirmed that a liquid crystal electro-optical device is produced that is free of light leakage from the scanning electrode portions and the signal electrode portions, by the black matrix 10 formed in the short circuit preventing film 9. Among 50 liquid crystal cells produced, no one shows a failure due to short-circuiting between the substrates.

As described above, by applying, to a liquid crystal electro-optical device, the short circuit preventing film having a metal oxide film formed by anode oxidation, short-circuiting can be prevented by a hard surface and a high breakdown voltage, and the contrast can be improved by a large dielectric constant. Further, since transparent regions and opaque regions can be formed arbitrarily, the black matrix function can be provided, to greatly improve the performance and reliability of the liquid crystal electro-optical device. The process of forming the black matrix can be simplified.

The application of the short circuit preventing film according to the invention is not limited to the transmission type active matrix liquid crystal electro-optical device, but it can also be applied very effectively to the simple matrix device and the reflection type active or simple matrix device.

The short circuit preventing film of the invention exhibits superior performance also when it is formed on an opaque electrode. The kind of liquid crystal material used does not impose any limitation on the short circuit preventing film.

Although the present invention has been described above by the embodiment, the invention is not limited to the embodiment but various modifications are possible without departing from the spirit and scope of the invention.

What is claimed is:

1. A liquid crystal electro-optical device comprising:
   a pair of transparent substrates opposed to each other, each of said substrates having a transparent electrode formed thereon; and
   a liquid crystal layer interposed between said substrates, wherein one of said substrates includes a non-transparent film comprising a metal formed on portions of said transparent electrode and a transparent insulating film covering said non-transparent film and formed on an entire surface of said electrode, said transparent insulating film comprising an oxide of said metal; and
   wherein the other one of the substrates is provided with an active matrix circuit comprising thin film transistors.

2. The device of claim 1, wherein the transparent insulating film is formed between the transparent electrodes.

3. The device of claim 2, wherein the non-transparent film is in contact with the transparent electrode.

4. The device of claim 3, wherein the metal includes at least one of aluminum, titanium, tantalum, and tungsten.

5. The device of claim 1, wherein the transparent electrode in the one of the substrates is a counter electrode.

6. The device of claim 1, wherein the transparent electrode is used as an anode in anode oxidation.

7. The device of claim 1, wherein the metal includes at least one of aluminum, titanium, tantalum, and tungsten.

8. The device of claim 1, wherein the non-transparent film has a grid shape.

9. The device of claim 8, wherein the metal includes at least one of aluminum, titanium, tantalum and tungsten.

10. The device of claim 1 wherein said transparent electrode comprises a conductive oxide material.

11. The device of claim 1 wherein said transparent insulating film comprises an anodic oxide of said metal.

12. A device according to claim 1 wherein said oxide is formed by oxidizing a film of the same metal deposited on the transparent electrode.

13. A device according to claim 1 wherein the dielectric constant of said transparent insulating film is from 8 to 9.

14. A liquid crystal electro-optical device comprising:
   a first substrate having a plurality of pixel transistors and a plurality of pixel electrodes formed thereon;
   a second transparent substrate opposed to said first substrate;
   a counter transparent electrode formed on said second substrate;
   a light shielding means formed on said counter transparent electrode corresponding to said plurality of pixel transistors, said light shielding means comprising a metal film;
   a transparent insulating film covering said light shielding means and formed over an entire surface of said counter transparent electrode,
   wherein said transparent insulating film comprises an oxide of a same metal constituting said metal film.

15. The device of claim 14, wherein the metal film includes at least one of aluminum, titanium, tantalum and tungsten.

16. The device of claim 14, wherein the oxide is produced by anode-oxidizing the metal film using the counter transparent electrode as an anode.

17. A method for producing a liquid crystal electro-optical device, comprising the steps of:

forming a metal film on a transparent electrode;

forming a mask on a selected surface of the metal film;

oxidizing an exposed surface of the metal film by a first anodic oxidation step where the portion of the metal film below said mask is not oxidized;

removing the mask after the first anodic oxidation step; and then oxidizing at least said selected surface of the metal film by a second anodic oxidation step.

18. The method of claim 17, wherein the metal film includes at least one aluminum, titanium, tantalum and tungsten.

19. The method of claim 17, wherein the transparent electrode is used as an anode in anode oxidation.

20. A method according to claim 17 wherein said second anodic oxidation step is performed so that the metal film of said exposed surface is oxidized completely through its thickness while the metal film of said selected surface is oxidized not completely through its thickness so that a portion of the metal film remains unoxidized as a light blocking layer.

21. A method for producing a liquid crystal device comprising a first substrate having an active matrix circuit thereon, a second substrate opposed to said first substrate and having a transparent counter electrode and a light shielding film formed on said second substrate, and a liquid crystal layer disposed between said first and second substrates, said method comprising the steps of:

forming a metal film on an entire surface of said transparent counter electrode on said second substrate, said metal film having a first area and a second area;

anodic oxidizing said metal film to form an anodic oxide film in such a manner that said metal film is oxidized completely through its thickness in said first area and only an upper portion of said metal film is oxidized to remain a portion of the metal film not oxidized in said second area, wherein said anodic oxide film covers the entire surface of the transparent counter electrode as a short circuit preventing film and the metal film remaining in said second area functions as said light shielding film.

22. A method according to claim 21 wherein said light shielding film is patterned in a grid shape.

\* \* \* \* \*